United States Patent [19]

Games et al.

[11] 3,860,877

[45] Jan. 14, 1975

[54] CONSTANT SLEW RATE FILTERING

[75] Inventors: John E. Games, Granby; Clarence Casper, Jr., Windsor; Lertram F. Kupersmith, Bloomfield, all of Conn.

[73] Assignee: United Aircraft Corporation, East Hartford, Conn.

[22] Filed: Jan. 31, 1974

[21] Appl. No.: 438,309

Related U.S. Application Data

[62] Division of Ser. No. 367,070, June 4, 1973.

[52] U.S. Cl. ................................ 328/167, 328/147
[51] Int. Cl. ............................................ H04b 15/00
[58] Field of Search ............................ 328/167, 147

[56] References Cited
UNITED STATES PATENTS
3,628,163   12/1971   Heibel................................ 328/167
3,735,266   5/1973   Amitay ........................... 328/167 X Primary Examiner—John S. Heyman
Attorney, Agent, or Firm—M. P. Williams

[57] ABSTRACT

A pair of active rate limiting filters which limit the rate of change of the output thereof with respect to the input thereto include means to compare the output with the input and to increase the slew rate significantly when the output differs by more than the predetermined amount from the input. Additionally, the slew rate can be increased in response to an external control signal.

4 Claims, 1 Drawing Figure

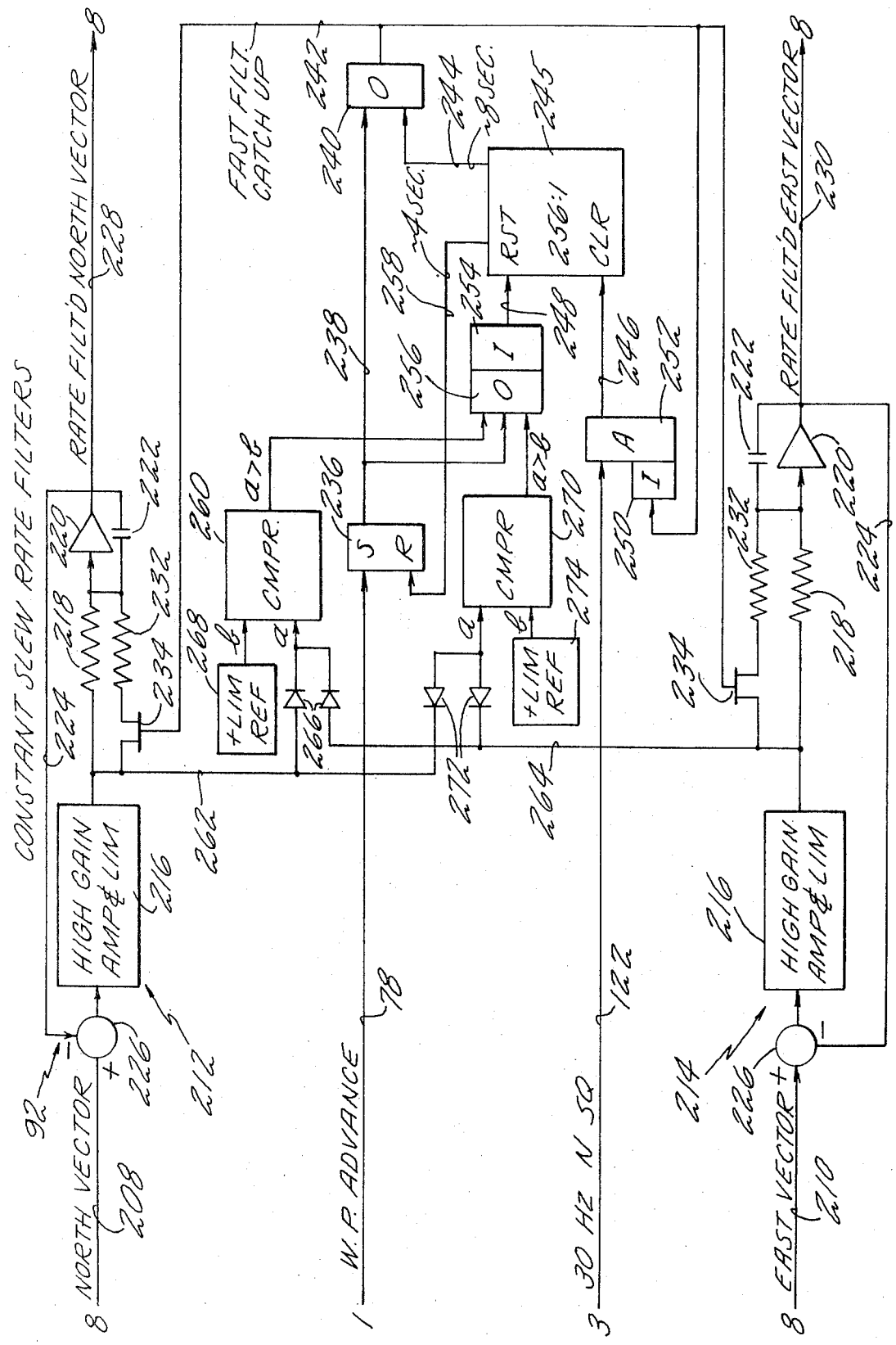

CONSTANT SLEW RATE FILTERING

This is a division of application Ser. No. 367,070, filed June 4, 1973.

BACKGROUND OF THE INVENTION

1. Field of Invention

This invention relates to area navigation computers, and more particularly to constant slew rate filtering.

2. Description of the Prior Art

A recent advance in area navigation computers comprises the utilization of constant slew rate filtering so as to eliminate scallops, noise and other unwanted components from the signals received from a VOR ground station and its related distance measuring equipment. Navigation computers of one type known to the art have provided distance and bearing of the aircraft to the ground station in X and Y coordinates for slew rate filtering, in order to provide the slew rate filtering purely on a distance basis, rather than on a basis of angle plus distance.

Another type of area navigation computer of recent design is much simpler than the aforementioned type, using analog vector summations to avoid the necessity of processing signals in X and Y coordinate form. However, rate filtering in vector summation computers known to the art is limited simply to filtering of the aircraft bearing to the VOR ground station, which filtering has a wide range of effect in dependence upon the distance of the aircraft to the ground station.

In navigation computers of these types, whenever the waypoint or the VOR station involved in a computation of courses and distance to desired waypoints are abruptly changed, slew rate filtering presents the apparatus from indicating correct course and distance for some time, due to the inherent lack of filtered outputs. Additionally, extremely rapid changes which can occur as an airplane flies very close to a navigation station, for instance, are similarly delayed such that the course and distance information is not kept up to date.

SUMMARY OF INVENTION

The object of the invention is to provide slew rate filtering of a type useful in an electronic area navigation computer.

In accordance with the present invention, a constant slew rate filter for processing a pair of orthogonal vectors representing resolved distances includes a fast catch up mode operated in response to a single timer, indicating that either of the vectors is changing more rapidly than the rate permitted by the respective filter, to significantly decrease the time constant of the integrator in both filters, thereby to allow the filters to catch up to the rapid change.

In accordance further with the present invention, a constant slew rate filter has a fast catch up mode which can be activated when changing from one waypoint to another, whereby the filter can be utilized downstream of the summation of the aircraft/VOR vector with the desired waypoint/VOR vector, without limiting the ability of an area navigation computer to respond rapidly to changes in waypoint.

The invention provides improved constant slew rate filtering utilizing but a single timer, and further provides slew rate filtering with forced catch up mode to permit usage in filtering vectors which may have stepped function changes provided therein.

Other objects, features and advantages of the present invention will become more apparent in the light of the following detailed description of preferred embodiments thereof, as illustrated in the accompanying drawing.

BRIEF DESCRIPTION OF THE DRAWING

The sole FIGURE herein is a schematic block diagram of a constant slew rate filter in accordance with the present invention.

DESCRIPTION OF THE PREFERRED EMBODIMENT

The present invention is disclosed herein in the same fashion as it appears as FIG. 9 in the aforementioned parent application. The drawings references in the margins of the FIGURE herein refer to the drawings of the aforementioned parent application. In the present application, the signals provided to the slew rate filters for slew rate filtering are signals representing a north vector and an east vector representative of a distant-to-waypoint phasor generated by apparatus disclosed in the aforementioned parent application. In the parent application, signals received from a VOR receiver include a 30 Hz north signal and a 30 Hz variable phase signal, the comparison of which represents the bearing of an aircraft to a VOR station. A signal received from a DME receiver represents the distance to the station. These are combined with signals representing the bearing and distance of a waypoint to that station such that the bearing and distance of the aircraft to the waypoint can be determined. In said parent application, the station signals and waypoint signals are combined in polar coordinates so as to generate a single phasor, the amplitude of which represents the distance to the waypoint and the absolute phase of which represents the bearing to the waypoint. This phasor is resolved into rectangular coordinates to provide signals representing the north and east vector representations of the phasor, which are applied for slew rate filtering in the apparatus herein.

After filtering, the signals are recombined into a phasor representation for utilization by various indicator apparatus in the aircraft.

Referring now to the drawing, the constant slew rate filters 92 comprise a pair of rate limiting filters of a general type known to the prior art, with fast catch up provisions provided thereto in accordance with the present invention, and with a fast catch up timing system in accordance with the invention. The integrators 212, 214 are generally of the type illustrated in Best Patent 3,373,675, and each comprises a high gain amplifier and limiter 216 driving an integrator comprised of a resistor 218, an operational amplifier 220, and a feedback capacitor 222. The output of the integrator is connected by a feedback path 224 to an input summing junction 226 of the high gain amplifier/limiter 216 for subtraction from the input voltage thereto supplied on either of the lines 208 or 210. The signal lines 224 are each connected to the rate filtered vector output lines 228, 230 which carry the rate filtered north vector and rate filtered east vector component, respectively.

A first modification to the constant slew rate filters 92 in accordance with the invention comprises the provision of an additional resistor 232 connected in series with an electronic switch, such as a FET 234, across the resistor 218. When the switches 234 are actuated, the resistors 232 are in shunt with the resistors 218, and these resistors are provided with a much smaller resistance (by several orders of magnitude) than the resistance of the resistors 218. This significantly reduces the time constant of the integrator portion of the rate limited filters 212, 214 so as to allow the outputs to vary at a rate greater than the constant slew rate designed into the filters for catching up. This may occur when a new VOR station is selected or when the waypoint is changed, so that the distance to the waypoint changes in a step function fashion by a very large amount. Such event is signaled by the appearance of the waypoint advance signal on the line 78, which sets a bistable device 236 thereby providing a signal on a line 238 which is passed through an OR circuit 240 to provide a fast filter catch up signal on a line 242 that actuates the electronic switches 234, decreasing the time constant, and allowing a rapid change in the output signals on the lines 228, 230 and on the feedback paths 224. The OR circuit 240 can also be operated by a signal on a line 244 which is provided by the output of a 256:1 counter 245 which is stepped at 30 Hz by a signal on a line 246, whenever a forced reset signal is not present on a line 248. Once the signal appears on the line 244 so that the OR circuit 240 provides a signal on a line 242, it is applied to an inverter 250 to block an AND circuit 252 so that the 30 Hz north squared signal on the line 122 is no longer passed over the line 246 to advance the countdown, whereby the last stage remains active and continues to provide the signal on the line 242. The 30 Hz north squared signal on the line 122 is simply used for convenience in this case, and any other 30 Hz source could be used, or source of a different frequency together with a different countdown could be used so as to provide either the eight second time interval or some other time interval which may be deemed appropriate. The forced reset signal on the line 248 is generated by an inverter 254 in response to the lack of a signal from an OR circuit 256 which has three inputs. One of the inputs is the signal on the line 238 indicating that the waypoint has been changed. This causes the reset signal on the line 248 to disappear so that the counter 245 starts to count, and after counting halfway through, it generates a 4 second signal on a line 258 which is used to reset the bistable 236. If the filters have not caught up to the new waypoint by the end of 4 seconds, then apparatus (about to be described) which senses the fact that the filters are falling behind, will cause the countdown to continue so that after an additional 4 seconds, the 8 second signal appears on the line 244 to again cause the generation of the fast filter catch up signal on the line 242. The fact that the filters are falling behind in keeping up with the input signal is determined by a pair of compare circuits, one of which 260 compares positive signals from the amplifiers 216 on lines 262, 264, isolated from each other by diodes 266, with the voltage of a positive limit reference source 268, and the other compare circuit 270 compares negative voltages on the lines 262, 264, isolated by diodes 272, with the voltage of a minus limit reference source 274. The output of the constant slew rate filters on the lines 228, 230 should be no higher than roughly the greatest speed of the aircraft; in other words, if one is flying directly to the waypoint, and directly on either the north or the east vector, than the greatest rate of change of that vector would be the speed of the aircraft. If the vectors, however, are changing at a rate greater than the anticipated maximum rate of change, which could occur as a result of VOR scalloping effects, (i.e., erroneous noise signals of an unreasonably high frequency nature) then the output of the slew rate filters would be limited to a maximum rate of change. Due to the fact that the vector outputs on lines 228, 230 are generated by the integrator circuits, the magnitude of the voltage on the lines 262, 264 is only a function of the difference between the input and the output. When the input changes at a rate no greater than a rate which the integrators can follow, the voltage on lines 262, 264 are proportional to the rate but less than the limits of 268 and 274; when the input changes at a faster rate, the summer 226 does not fully cancel, and the voltages on lines 262, 264 builds up. Thus, the plus limit reference source 268 and minus limit reference source 274 can be selected to be something on the order of 5 or 10 percent lower than the slew rate maximum determined by the time constant of the integrator, so that when such a voltage is exceeded, the impending creation of an error can be sensed, and the filters can be switched into the fact catch up mode after a given time interval. This is achieved when either one of the compare circuits 260, 270 applies an output to the OR circuit 256 which removes the reset from the countdown 245 so that if the impending error persists for 8 seconds, then the filters will switch into the fast mode.

Thus, the constant slew rate filters 92 of the drawing provide, in accordance with the invention, fast integration of both filters in response to a single timer having sensed that either of the filters is unable to respond rapidly enough to accommodate the change of input, and further provides for a step function compensation when waypoints are being advanced, by directly causing at least a 4 second fast filter catch up mode.

Thus, the various aspects of the present invention have been described, as illustrated in block form in the drawing. Various aspects of the invention may be utilized independently of other aspects, if desired. For instance, the constant slew rate filter may be utilized in other environments than the area navigation computer. Similarly, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A constant slew rate filter means comprising:
a pair of active rate limiting filters, each including an amplifier, each normally operable to provide a preselected limit on the rate of change of an output signal with respect to an input signal, each including selectively operable means to increase substantially the rate at which the output signal may change with respect to the input signal;
means responsive to the output signal and the input signal of each of said amplifiers for comparing the difference between the input and output of each amplifier with a predetermined limit and for generating an excess signal in response to said difference being greater than said predetermined limit; and timing means responsive to said excess signal for generating a signal for operating said selectively operable means in each of said active filters for a predetermined time interval following the occurrence of said excess signal.

2. A constant slew rate filter means according to claim 1 wherein said timing means comprises a counter means including means operative in the absence of said excess signal to force said counter means to a reset state, and selectively operable means to provide clock signals to said counter means to advance the state of said counter means when said counter means is in other than the forced reset state, said selectively operable means being blocked by the presence of said operation signal output from said timing means, whereby said timing means maintains the presence of said operation signal once it is generated until the removal of said excess signal causes the forced resetting of said counter means.

3. A constant slew rate filter means according to claim 1 wherein said timing means further comprises means responsive to a control signal applied thereto for substantially instantaneously causing the generation of said operation signal for a predetermined time interval.

4. A constant slew rate filter means according to claim 3 wherein said timing means further comprises bistable means responsive to a control signal for removing the forced reset to said counter means and for instantaneously generating said operation signal as an alternative to the input of said counter means; and means responsive to a predetermined count of said counter means less than that which normally generates said operation signal for resetting said bistable means.

* * * * *

PO-1050
(5/69)

UNITED STATES PATENT OFFICE
CERTIFICATE OF CORRECTION

Patent No. 3,860,877          Dated January 14, 1975

Inventor(s) John E. Games, Clarence Casper, Jr., Bertram F. Kupersmith

It is certified that error appears in the above-identified patent and that said Letters Patent are hereby corrected as shown below:

Last named inventor, "Lertram F. Kupersmith" should read -- Bertram F. Kupersmith --

Column 2, line 18, "present" should read -- parent --

Column 2, line 21, "distant" should read -- distance --

Column 4, line 22, "fact" should read -- fast --

Column 6, line 12, "input" should read -- output --

Signed and sealed this 1st day of April 1975.

(SEAL)
Attest:

RUTH C. MASON
Attesting Officer

C. MARSHALL DANN
Commissioner of Patents
and Trademarks